United States Patent

Patterson et al.

(10) Patent No.: US 6,683,534 B2
(45) Date of Patent: Jan. 27, 2004

(54) VEHICLE SEAT OCCUPANT DETECTION SYSTEM WITH SEAT CUSHION IDENTIFYING TRANSPONDER

(75) Inventors: James F. Patterson, Greentown, IN (US); Duane D. Fortune, Lebanon, IN (US); Charles A. Gray, Noblesville, IN (US)

(73) Assignee: Delphi Technologies, Inc, Troy, MI (US)

( * ) Notice: Subject to any disclaimer, the term of this patent is extended or adjusted under 35 U.S.C. 154(b) by 106 days.

(21) Appl. No.: 10/159,661

(22) Filed: May 31, 2002

(65) Prior Publication Data

US 2003/0222767 A1 Dec. 4, 2003

(51) Int. Cl.⁷ ................................................ B60Q 1/00
(52) U.S. Cl. ...................... 340/436; 180/271; 280/735; 701/45
(58) Field of Search ............................. 340/457.1, 436, 340/438; 280/735, 808; 701/45; 180/271, 268

(56) References Cited

U.S. PATENT DOCUMENTS

| | | | | |
|---|---|---|---|---|
| 5,515,933 A | * | 5/1996 | Meyer et al. ............... | 180/273 |
| 5,948,031 A | * | 9/1999 | Jinno et al. .................... | 701/45 |
| 6,161,070 A | * | 12/2000 | Jinno et al. .................... | 701/45 |
| 6,329,913 B1 | * | 12/2001 | Shieh et al. ................ | 340/561 |
| 6,345,840 B1 | * | 2/2002 | Meyer et al. ............... | 280/735 |

\* cited by examiner

*Primary Examiner*—Brent A. Swarthout
(74) *Attorney, Agent, or Firm*—Robert M. Sigler; Stefan V. Chmielewsk

(57) ABSTRACT

In a vehicle seat occupant detection system, a transponder in a seat cushion is responsive to an activating signal to generate an electromagnetic signal containing unique seat identification data. An occupant detection system module senses a seat characteristic and derives therefrom an occupant detection signal. The module further generates the transponder activating signal and receives and processes the electromagnetic signal to derive the contained seat identification data. The module determines if there is seat identification data in a dedicated memory location in rewritable, non-volatile memory and, if there is, compares it to the seat identification data from the electromagnetic signal. If they do not match, the derivation of a valid occupant detection signal is prevented. If there is no seat identification data in the dedicated memory location, the module causes the seat identification data from the electromagnetic signal to be copied to the dedicated memory location if it remains unchanged for a predetermined number of transponder activations so as to allow authorized matching of a seat cushion and module.

6 Claims, 7 Drawing Sheets

VEHICLE SEAT OCCUPANT DETECTION SYSTEM WITH SEAT CUSHION IDENTIFYING TRANSPONDER

TECHNICAL FIELD

The technical field of this invention is a seat occupant detection system for a vehicle.

BACKGROUND OF THE INVENTION

Vehicle seat occupant detection systems are used to help decide whether or how to deploy an airbag in a crash event. At least one such system provides an occupant characteristic sensor in a vehicle seat member to determine the weight of a seat occupant. The determination is made by a programmed computer provided in an occupant detection system module, the computer having an input connection from a seat characteristic sensor such as a fluid pressure sensor connected to a fluid filled bladder on the seat pan under the bottom seat cushion member. The output signal from the sensor is compared with seat calibration data, typically including calibrated threshold values, to characterize a detected seat occupant.

The seat calibration data are initially determined in calibration tests of the occupant detection system, which includes the seat cushion member, bladder, sensor and occupant detection system module, and are typically stored in rewritable, non-volatile memory such as EEPROM in the occupant detection system module. Since seat cushion members are generally made of a synthetic foam material that can change its force or pressure transfer characteristics with age and/or environmental variables, the use of the rewritable, non-volatile memory allows updating of the seat calibration data during vehicle operation, service or recalibration. To ensure that the seat calibration data are not lost, the vehicle manufacturer may direct that the system be replaced only by a complete, calibrated system that includes seat cushion member, bladder, sensor and occupant detection system module storing seat calibration data for the replacement seat cushion member. In the case of failure of the occupant detection system module, replacement of the module by itself will result in stored seat calibration data for the wrong seat cushion member, which could render the occupant detection system unreliable. It is thus desirable to provide detection of such an occurrence so that a need for corrective action may be signalled.

SUMMARY OF THE INVENTION

In one aspect of the invention, a vehicle seat cushion has a transponder responsive to a transponder activating signal to generate an electromagnetic signal containing unique seat identification data. Sensing apparatus is responsive to a characteristic of the vehicle seat cushion to generate a seat characteristic signal thereof; and an occupant detection module is responsive to the seat characteristic signal to derive a seat occupant signal and has a dedicated memory location for seat identification data in a rewritable, non-volatile memory. The occupant detection module generates the transponder activating signal, receives and processes the electromagnetic signal to derive the seat identification data therefrom and compares the seat identification data from the electromagnetic signal with seat identification data in the dedicated memory location. If the seat identification data from the electromagnetic signal does not match the seat identification data in the dedicated memory location, the occupant detection module generates a warning signal and preferably prevents derivation of the seat occupant signal.

In another aspect of the invention, the occupant detection module further determines if there is seat identification data in the dedicated memory location and, if there is no seat identification data in the rewritable, non-volatile memory, copies the seat identification data from the electromagnetic signal to the dedicated memory location.

In yet another aspect of the invention, a vehicle seat cushion has a transponder responsive to a transponder activating signal to generate an electromagnetic signal containing unique seat identification data. Sensing apparatus is responsive to a characteristic of the vehicle seat cushion to generate a seat characteristic signal thereof; and an occupant detection module is responsive to the seat characteristic signal to derive a seat occupant signal and has a dedicated memory location for seat identification data in a rewritable, non-volatile memory. The occupant detection module further generates the transponder activating signal, receives and processes the electromagnetic signal to derive the seat identification data therefrom and determines if there is seat identification data in the dedicated memory location. If there is no seat identification data in the dedicated memory location, the occupant detection module further determines if the seat identification data from the electromagnetic signal matches seat identification data from a previously received electromagnetic signal and, if so, increments a count and stores the seat identification data from the electromagnetic signal as the seat identification data from a previously received electromagnetic signal. If the count exceeds a predetermined reference value, the seat identification data from the electromagnetic signal is copied to the dedicated memory location. But if there is seat identification data in the dedicated memory location, the occupant detection system module compares seat identification data from the electromagnetic signal with seat identification data in the dedicated memory location. If the seat identification data from the electromagnetic signal does not match the seat identification data in the dedicated memory location, the occupant detection module generates a warning signal and preferably prevents derivation of the seat occupant signal.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
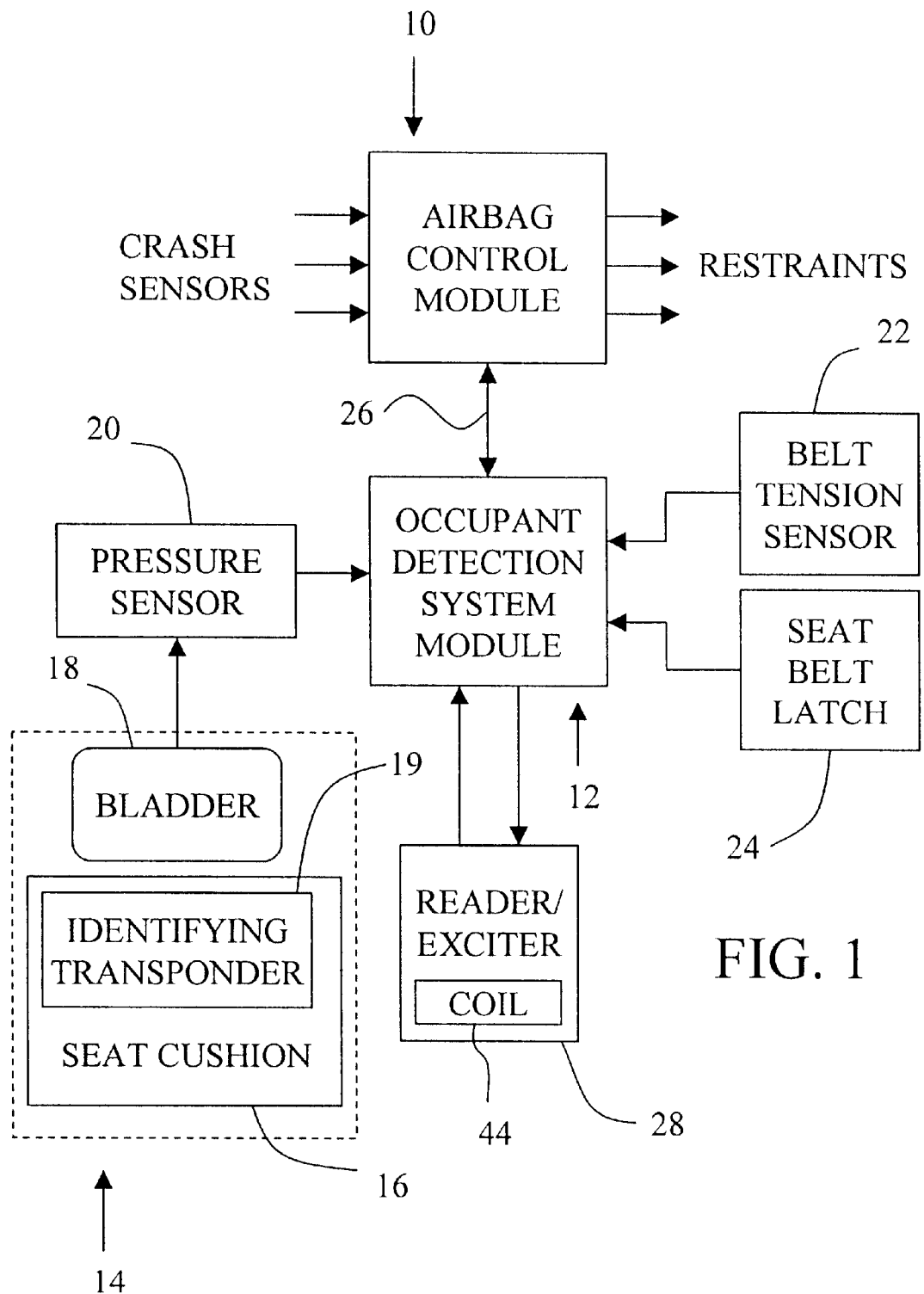
FIG. 1 is a block diagram of a vehicle occupant protection system with a vehicle occupant detection system according to this invention.

A vehicle occupant protection system, as shown in FIG. 1, comprises an airbag control module (ACM) 10 that receives signals from crash sensors, not shown, and provides deploy signals as required to restraints, not shown, such as airbags. The crash sensors and airbags may be any such articles known in the art for use in vehicle restraint systems. A vehicle seat 14 is provided with a seat cushion member 16, generally comprising a shaped block of foam material providing a comfortable seating support, usually covered in a fabric for appearance, comfort and protection. A bladder 18 packaged with seat cushion member 16 is typically located under seat cushion member 16 but above a seat pan member, not shown, and is filled with a non-compressible fluid so as to generate a pressure in the fluid in response to the weight of a seat occupant on the seat cushion member. The pressure in the fluid is sensed by a pressure sensor 20 that, together with bladder 18, forms a seat characteristic sensor apparatus providing an output seat characteristic signal of the weight born by seat cushion member 16. This signal is provided to an occupant detection system (ODS) module 12 including a computer programmed to determine a seat occupant signal characterizing the occupancy status of the seat according to predetermined, stored calibrated classification threshold values. Additional signals involved in such determination may be provided by, for example, a seat belt tension sensor 22 and/or a switch in a seat belt latch 24. ACM 10 and ODS module 12 are adapted to communicate with each other over a communication bus 26, such as a standard vehicle communication bus, which also permits communication with other modules in the vehicle having memory.

Due to variations in seat foam, bladders, sensors and other physical parameters, each system is calibrated after assembly with a particular seat cushion member; and the calibrated threshold values are stored in memory within ODS module 12. These parameters may be changed by the ODS module during subsequent vehicle operation as characteristics change over time. For example, seat foam material changes its physical characteristics with age and is also subject to changes with environmental parameters. In a calibration process for a particular vehicle seat, one or more objects of predetermined weight and shape are dropped in a predetermined manner onto the installed seat cushion member to generate pressure readings for storage as the calibrated threshold values for determining the boundaries between occupant classifications. For the restraint deployment control to continue to meet its mandated operational standards, these calibrated threshold values must always be present for use; and it is also desired that they be updated as required to compensate for variations in physical and environmental seat characteristics over time. Since the values are calibrated with respect to a particular seat cushion, they must stay with that seat cushion.

To prevent the separation of a seat cushion 16 and an ODS module 12 including memory stored calibrated threshold values for the particular seat cushion, the vehicle manufacturer may require that any defect in the occupant detection system requiring replacement be accomplished through replacement of an entire occupant detection system, including at least seat cushion and an ODS module in a precalibrated combination. To ensure this and prevent unknowing operation of the vehicle should one of the seat cushion 16 and the ODS module 12 be replaced without the other, the apparatus of this embodiment provides an identifying transponder 19 in seat cushion 16 and a reader/exciter apparatus 28 with input and output connections to ODS module 12.

Figure 2:
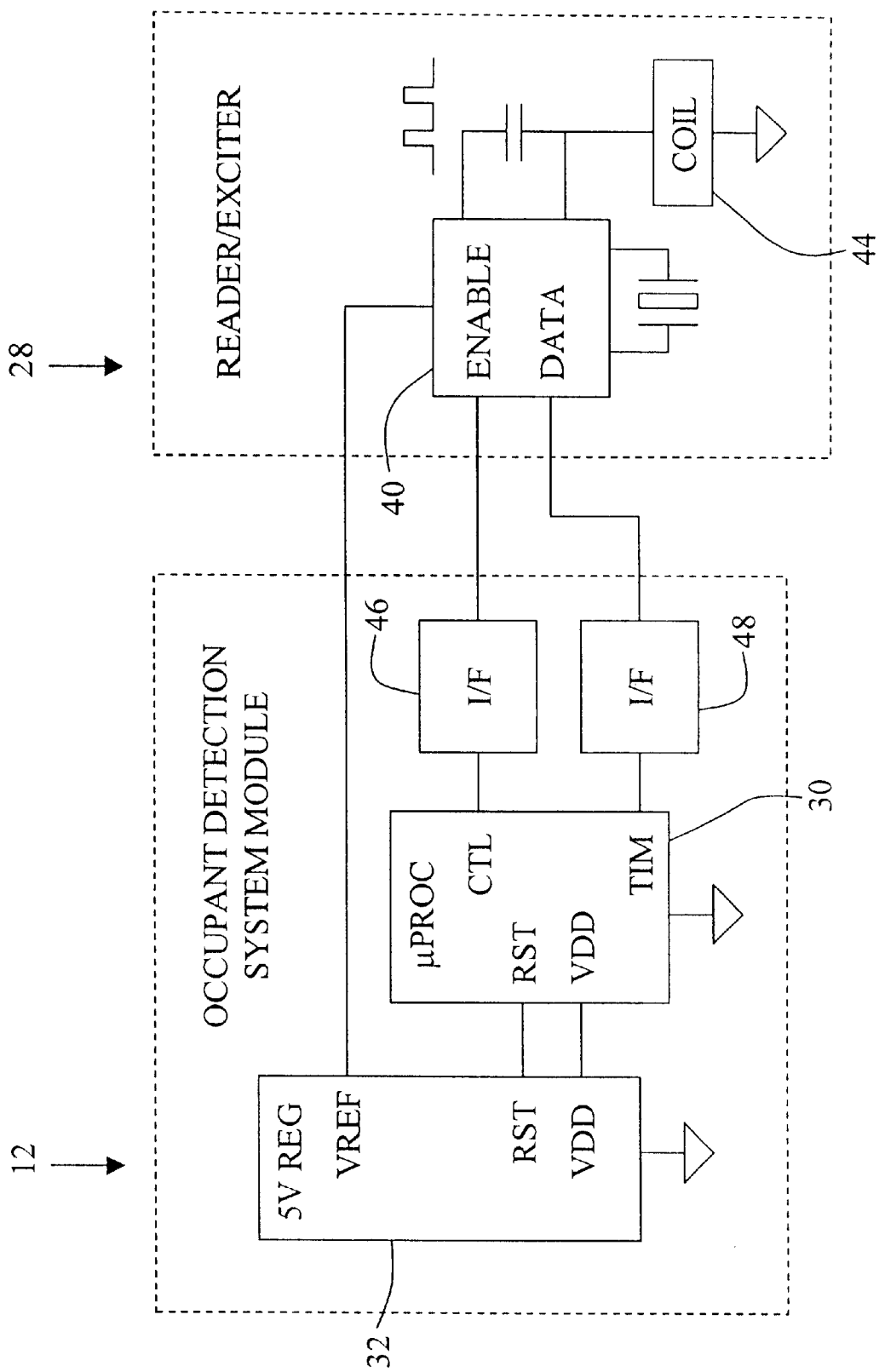
FIG. 2 is a schematic diagram of a portion of the system of FIG. 1.

ODS module 12 and reader/exciter apparatus 28 are shown in greater detail in FIG. 2. ODS module 12 includes a microprocessor based digital computer 30 that includes memory, both RAM and a rewritable, non-volatile memory such as EEPROM for storing the calibrated threshold values. Reader/exciter apparatus 28 includes a reader/exciter chip 40 connected through interface (I/F) blocks 46 and 48 to communicate digital data with computer 30. A regulated power supply chip 32 in ODS module 12 provides the required power for ODS 12 and reader/exciter 28. Reader/exciter 28 also includes a coil 44 connected with reader/exciter chip 40 to serve in a power transmission mode as the primary of an output transformer and, alternatively, in a communication mode as an RF transmitting and receiving antenna.

Figure 3:
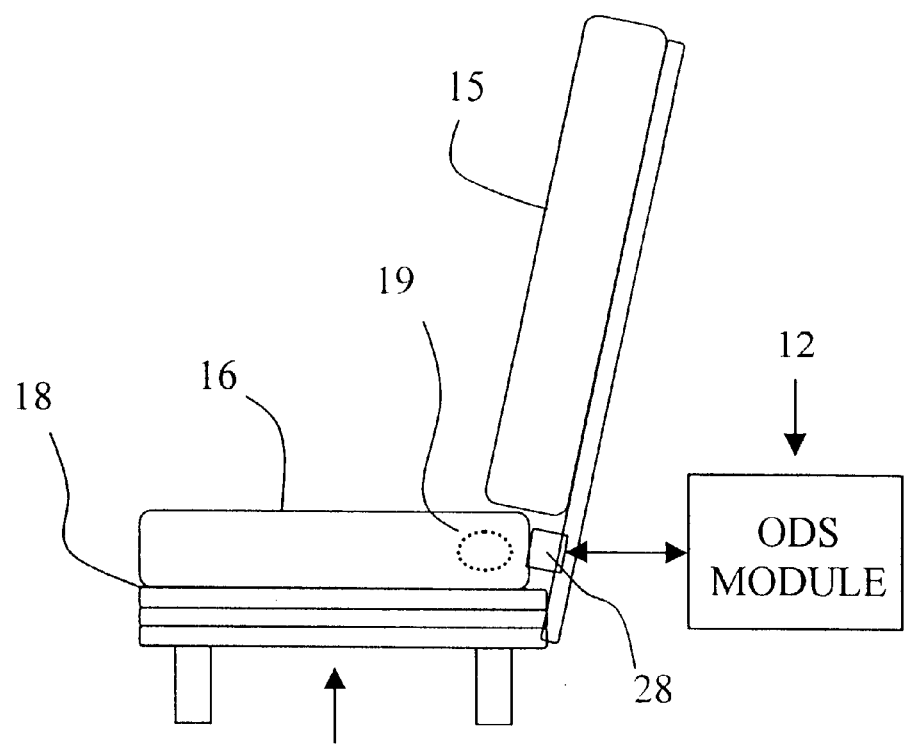
FIGS. 3 and 4 respectively show left side and top views of a vehicle seat having an occupant detection system as shown in FIGS. 1 and 2.
Figure 4:
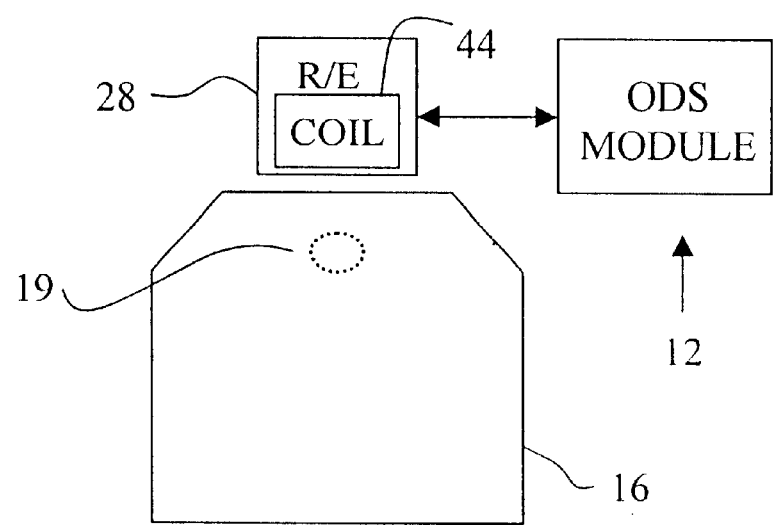
Figure 5:
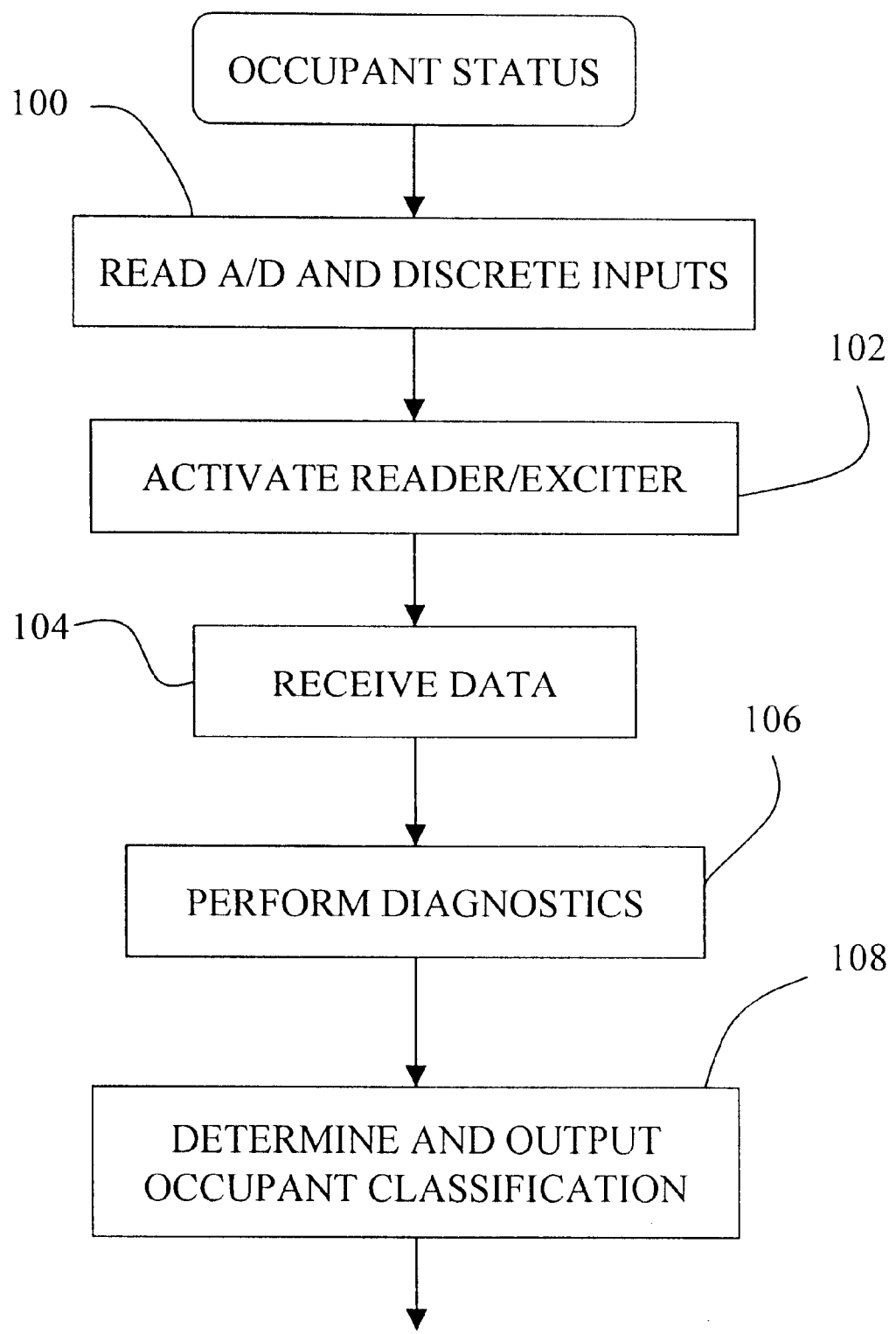
FIGS. 5 and 6A–6C show flow charts illustrating the operation of the system of FIGS. 1–4.

FIGS. 3 and 4 show two views of seat cushion 16 to illustrate the spatial relationship between transponder 19 embedded therein and reader/exciter apparatus 28 with coil 44. FIG. 3 is a side view of seat 14 showing seat cushion 16 atop bladder 18. Reader/exciter apparatus 28 is supported on seat 14 with its coil 44 near the rear of seat cushion 16 in close proximity to embedded transponder 19, which includes a coil of its own that is oriented relative to coil 44 to permit efficient transformer action at low frequencies and efficient RF communication at high frequencies. FIG. 4 shows a top view of seat cushion 16, rotated 90 degrees counter-clockwise, to show that transponder 19 in the seat cushion and reader/exciter apparatus with coil 44 are in close proximity at the middle of a rear surface of seat cushion 28. This rear location for transponder 19 is generally under the seat back cushion 15 and is thus generally subject to low physical stress for the protection of the transponder. The close proximity is required for efficient transmission of electrical power from reader/exciter 28 to transponder 19 in power transmission mode and to allow low power during RF transmissions and thus reduce unwanted RF emissions.

The reader/exciter and transponder combination is a known and existing apparatus for providing communication between a first electronic unit having an electric power source and a second electronic unit having no permanent electric power source. In performing a seat cushion communication operation, reader/exciter apparatus first operates in power transmission mode by providing low frequency AC current in coil 44, acting as a transformer primary coil to a secondary coil in transponder 19 and charging up a charge storage device therein such as a capacitor. Transponder 19 is then able to operate using this charge as electric power for a time sufficient to transmit the unique identifying data therein back through its own coil used as a transmitting antenna to coil 44, which receives the RF message, demodulates it for the digital code and provides the latter to microprocessor 30 of ODS 12.

FIGS. 5 and 6A–6C illustrate the operation of the system in greater detail. Microprocessor 30 of ODS 12 runs a routine OCCUPANT STATUS on a regular basis, for example every 100 milliseconds, to determine an occupant status of seat 14 and generate therefrom a seat occupant signal. As shown in the flow chart of FIG. 5, this routine begins at step 100 by reading the A/D and discrete inputs used in occupant classification. At step 102, reader/exciter 102 is signalled to activate transponder 19 as described above. The process of receiving identification data in an SFS message from transponder 19, via coil 44 and demodulation apparatus within reader/exciter 28, is activated at step 104; and a flag SFS DATA RCVD is set when the data reception is complete. A subroutine PERFORM DIAGNOSTICS is called at step 106; and the determination of occupant weight and classification is performed in the remainder of the routine 108 in a manner known in the art.

Figure 6A:
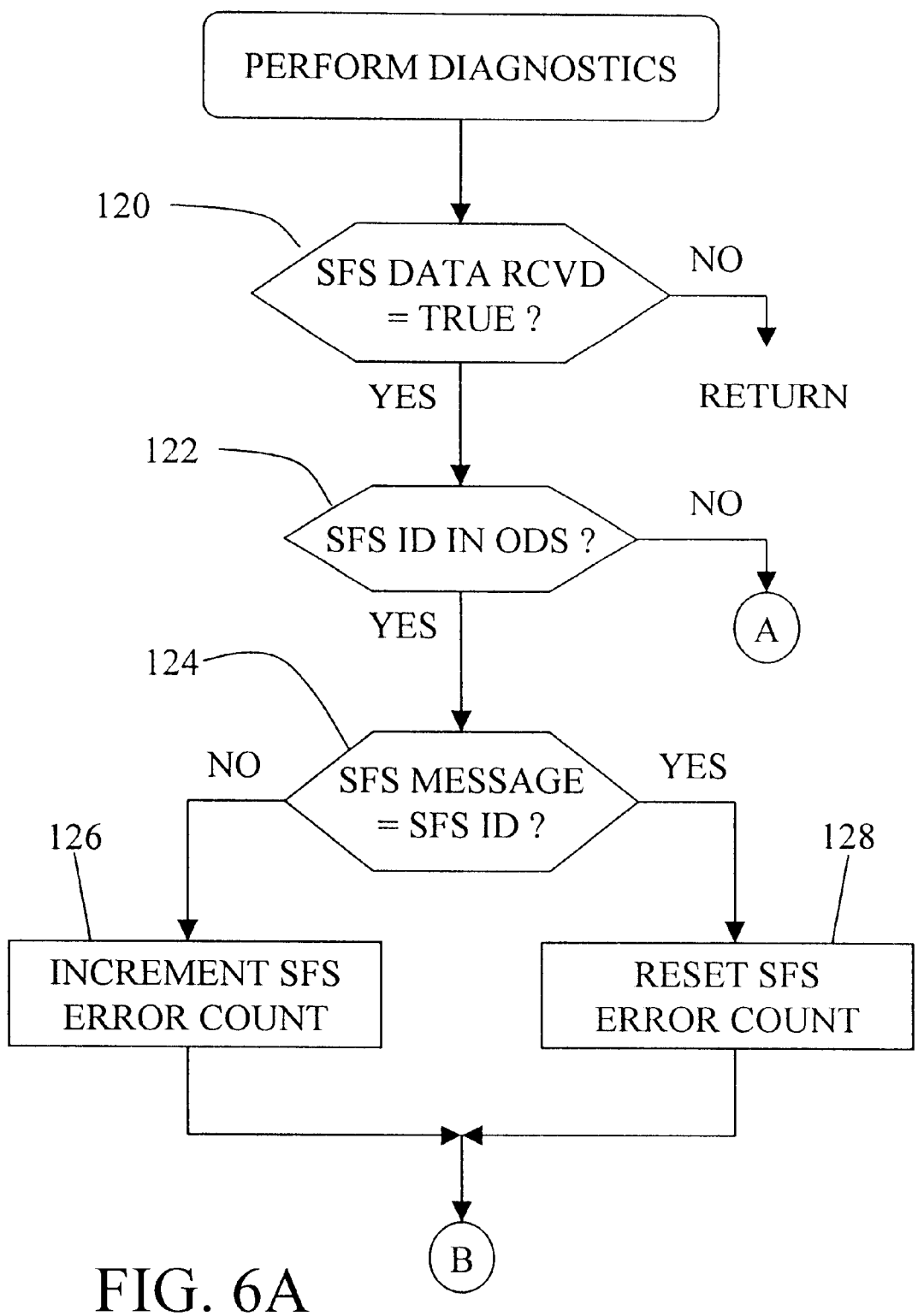
Figure 6B:
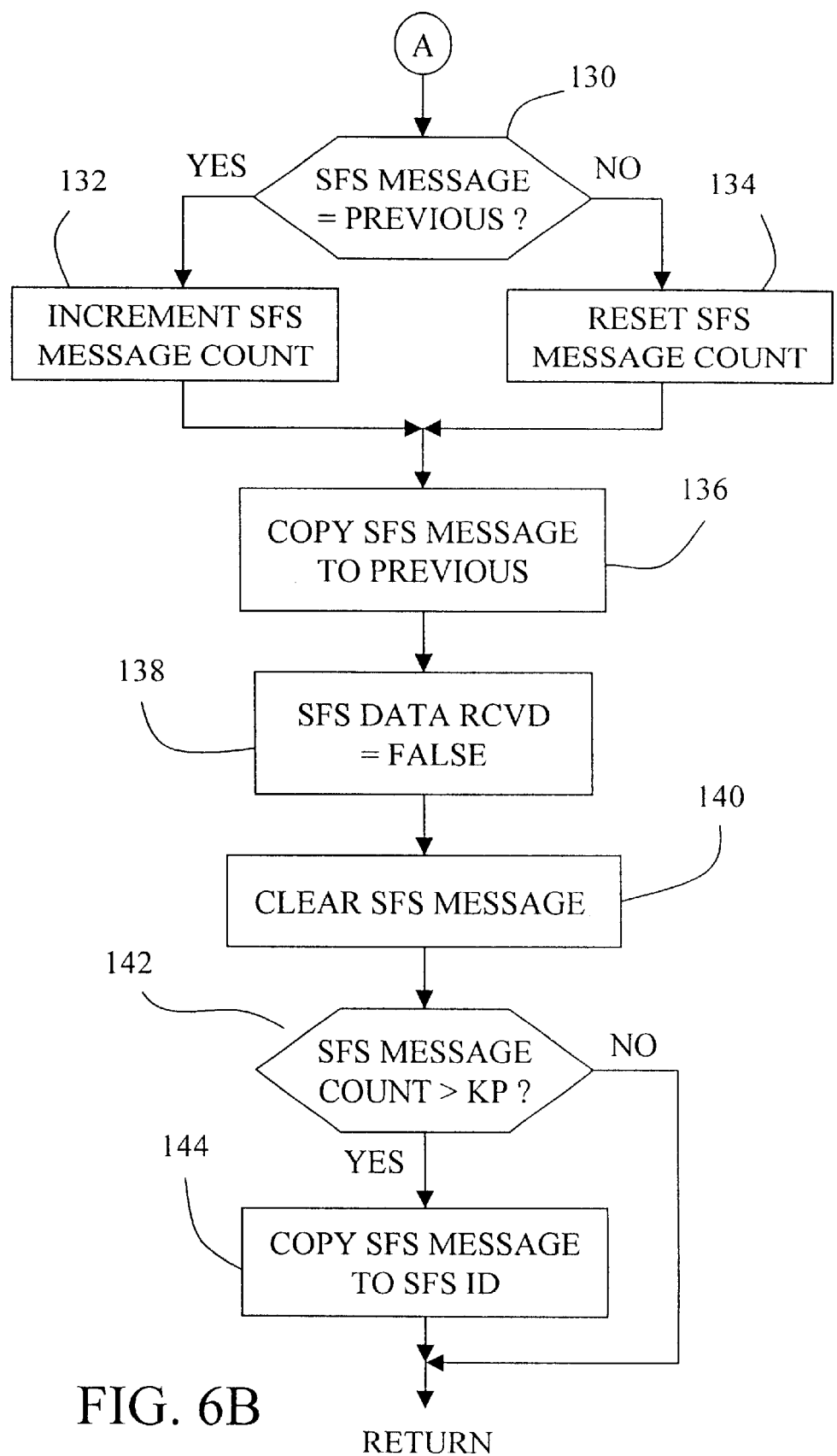
Figure 6C:
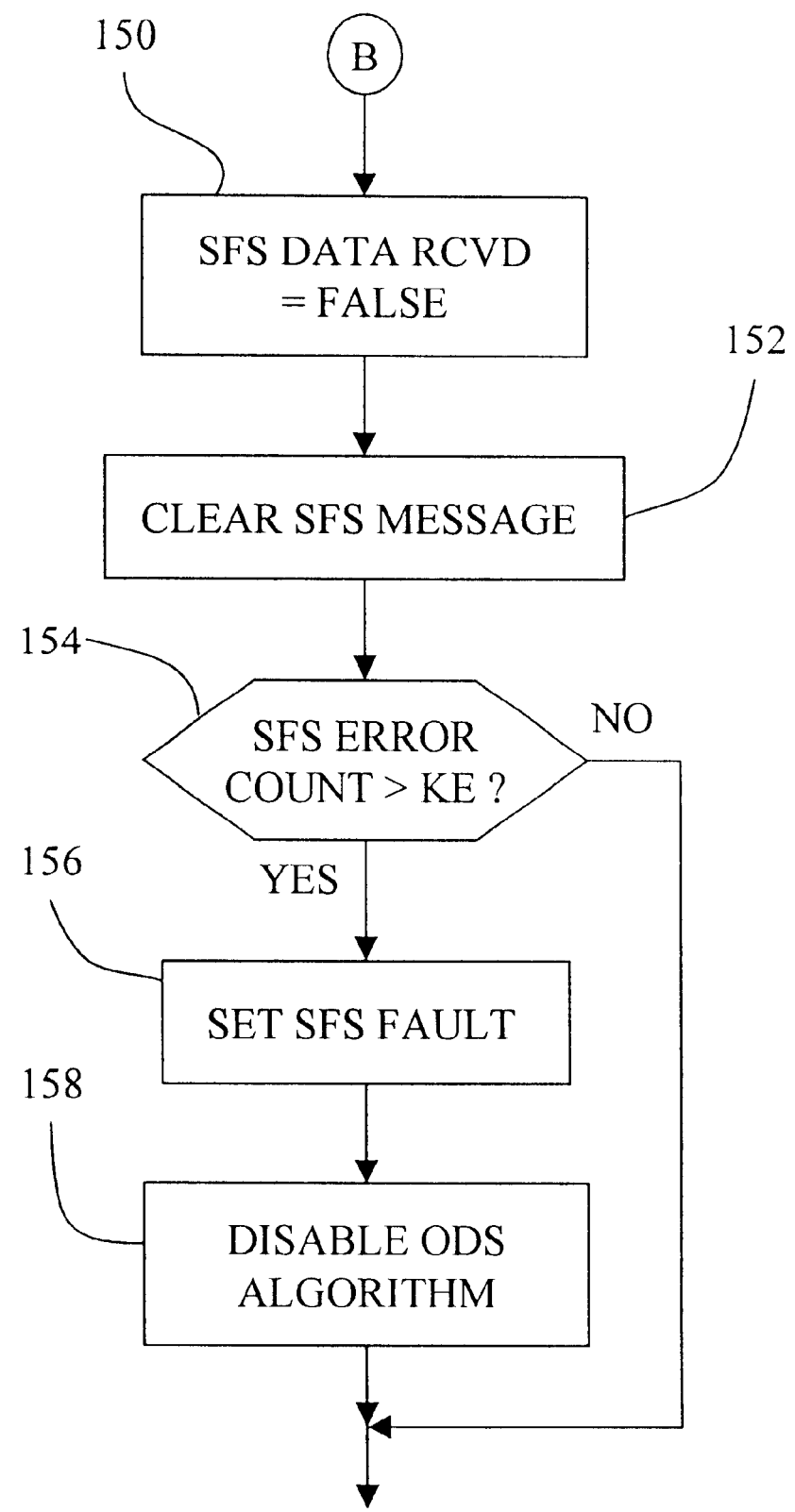

FIGS. 6A–6C illustrate the operation of subroutine PERFORM DIAGNOSTICS. At step 120 of FIG. 6A, the routine begins by determining if an SFS message containing seat cushion identification data has been received as indicated by flag SFS DATA RCVD. If this flag is not TRUE, the subroutine returns to routine OCCUPANT STATUS. But if the SFS DATA RCVD flag is TRUE, the subroutine determines at step 122 if there is SFS ID data in rewritable non-volatile memory within ODS module 12. If there is, the SFS ID data in ODS memory is compared with the seat cushion identification data in the SFS message at step 124. If there is match, an SFS error count is reset at step 128; if there is no match, the SFS error count is alternatively incremented at step 126.

From either of steps 126 and 128 the routine proceeds to step 150 in FIG. 6C via connector B in the Figures. At step 150 the routine resets the SFS DATA RCVD flag to FALSE; and the SFS message is cleared from RAM at step 152. At step 154, if the SFS ERROR count does not exceed a predetermined reference limit count KE, the subroutine returns to the routine OCCUPANT STATUS and an seat occupant signal is generated in the normal manner. But if the SFS ERROR count exceeds limit count KE, the subroutine sets an SFS FAULT flag at step 156 and disables the ODS algorithm at step 158 before exiting. The effect of the latter is determined by the requirements of the system but will typically be to prevent restraint deployment and provide an indication to the vehicle operator that service is required.

Returning to step 122 of FIG. 6A, if there is no SFS ID data in rewritable non-volatile memory within ODS module 12, the subroutine proceeds by way of connector A in the Figures to step 130 in FIG. 6B. At step 130, the subroutine determines if the data in the SFS message is the same as that stored from the previous loop of the subroutine and increments an SFS message count at step 132 if it is the same. If it is not the same, the SFS message count is reset at step 134 to an initial value such as zero. From either of steps 132 and 134, the subroutine next copies the present SFS message data to the RAM memory location of the previous SFS message at step 136 to replace the previous value, resets the SFS DATA RCVD flag to FALSE at step 138 and clears the SFS message at step 140. The SFS message count is then compared with a predetermined reference KP at step 142; and, if the count exceeds KP, the SFS Message data is copied to the SFS ID location in rewritable, non-volatile memory at step 144. This provides for matching a new ODS module to a vehicle seat cushion in manufacture or repair. From step 144, or from step 142 if the SFS message count does not exceed KP, the subroutine returns to the routine OCCUPANT STATUS.

What is claimed is:

1. A vehicle seat occupant detection system comprising:
    a vehicle seat cushion having a transponder responsive to a transponder activating signal to generate an electromagnetic signal containing unique seat identification data;
    sensing apparatus responsive to a characteristic of the vehicle seat cushion to generate a seat characteristic signal;
    an occupant detection module comprising means responsive to the seat characteristic signal for deriving a seat occupant signal and further comprising a dedicated memory location for seat identification data in a rewritable, non-volatile memory, the occupant detection module further comprising means for:
        (a) generating the transponder activating signal and receiving and processing the electromagnetic signal to derive the seat identification data therefrom,
        (b) comparing the seat identification data from the electromagnetic signal with seat identification data in the dedicated memory location, and
        (c) generating a warning signal when the seat identification data from the electromagnetic signal does not match the seat identification data in the dedicated memory location.

2. The vehicle seat occupant detection system of claim 1 further comprising means for preventing generation of the seat occupant signal when the seat identification data from the electromagnetic signal does not match the seat identification data in the dedicated memory location.

3. The seat occupant detection system of claim 1 wherein the occupant detection module further comprises means for:
    (d) determining if there is seat identification data in the dedicated memory location, and
    (e) if there is no seat identification data in the rewritable, non-volatile memory, copying the seat identification data from the electromagnetic signal to the dedicated memory location.

4. A vehicle seat occupant detection system comprising:
    a vehicle seat cushion having a transponder responsive to a transponder activating signal to generate an electromagnetic signal containing unique seat identification data;
    sensing apparatus responsive to a characteristic of the vehicle seat cushion to generate a seat characteristic signal;
    an occupant detection module comprising means responsive to the seat characteristic signal for deriving a seat occupant signal and further comprising a dedicated memory location for seat identification data in a first rewritable, non-volatile memory, the occupant detection module further comprising means for:
        (a) generating the transponder activating signal and receiving and processing the electromagnetic signal to derive the seat identification data therefrom,
        (b) determining if there is seat identification data in the dedicated memory location,
        (c) if there is no seat identification data in the dedicated memory, determining if the seat identification data from the electromagnetic signal matches seat identification data from a previously received electromagnetic signal,
        (d) if the seat identification data from the electromagnetic signal matches the seat identification data from a previously received electromagnetic signal, incrementing a count and storing the seat identification data from the electromagnetic signal as the seat identification data from a previously received electromagnetic signal,
        (e) if the count exceeds a predetermined reference value, copying the seat identification data from the electromagnetic signal to the dedicated memory location; and
        (f) if there is seat identification data in the dedicated memory location, comparing the seat identification data from the electromagnetic signal with seat identification data in the dedicated memory location and generating a warning signal when the seat identification data from the electromagnetic signal does not match the seat identification data in the dedicated memory location.

5. The vehicle seat occupant detection system of claim 4 further comprising means for preventing generation of the seat occupant signal when the seat identification data from the electromagnetic signal does not match the seat identification data in the dedicated memory location.

6. The vehicle seat occupant detection system of claim 4 wherein the transponder is disposed in the seat cushion near a rear surface thereof.

\* \* \* \* \*